US007268455B2

(12) United States Patent
Kouda et al.

(10) Patent No.: US 7,268,455 B2
(45) Date of Patent: Sep. 11, 2007

(54) 4-LAYER TYPE OF STATOR WINDING FORMED OF SEQUENTIALLY CONNECTED SEGMENTS LOCATED IN RESPECTIVE SLOT PAIRS, AND METHOD OF MANUFACTURE THEREOF

(75) Inventors: Shinji Kouda, Kariya (JP); Masahiro Seguchi, Oobu (JP)

(73) Assignee: Denso Corporation, Kariya (JP)

( * ) Notice: Subject to any disclaimer, the term of this patent is extended or adjusted under 35 U.S.C. 154(b) by 81 days.

(21) Appl. No.: 11/135,559

(22) Filed: May 24, 2005

(65) Prior Publication Data

US 2005/0258703 A1 Nov. 24, 2005

(30) Foreign Application Priority Data

May 24, 2004 (JP) ............................. 2004-153561

(51) Int. Cl.
*H02K 3/28* (2006.01)
*H02K 19/26* (2006.01)

(52) U.S. Cl. ...................... 310/184; 310/180; 310/198; 310/201; 29/596

(58) Field of Classification Search ................ 310/179, 310/180, 184, 201, 206, 207
See application file for complete search history.

(56) References Cited

U.S. PATENT DOCUMENTS 6,201,332 B1 3/2001 Umeda et al.
6,552,463 B2 4/2003 Oohashi et al.
6,825,589 B2 * 11/2004 Kouda et al. ............... 310/207
6,979,926 B2 * 12/2005 Ogawa et al. .............. 310/180

FOREIGN PATENT DOCUMENTS

JP A-2000-092766 3/2000
JP A-2002-058189 2/2002

* cited by examiner

*Primary Examiner*—Burton Mullins
(74) *Attorney, Agent, or Firm*—Ollif & Berridge, PLC

(57) ABSTRACT

A phase winding of a stator winding comprises one or more pairs of interconnected partial coil, each partial coil formed of sequentially connected U-shaped segment pairs, each pair comprising a large segment and small segment. Two segment legs, of the large and small segment respectively of such a pair, constitute first and second conductor layers of a first stator slot and have their tip portions mutually connected. The remaining two segment legs respectively constitute fourth and third conductor layers of a second slot that is distant by one pole pitch, and have their respective tip portions mutually connected.

9 Claims, 13 Drawing Sheets

U1a
U2a
301
302
2001
2002
302'
301'
U1b
U2b
S1
S2
S3
S4
S5
S6
S7
S8

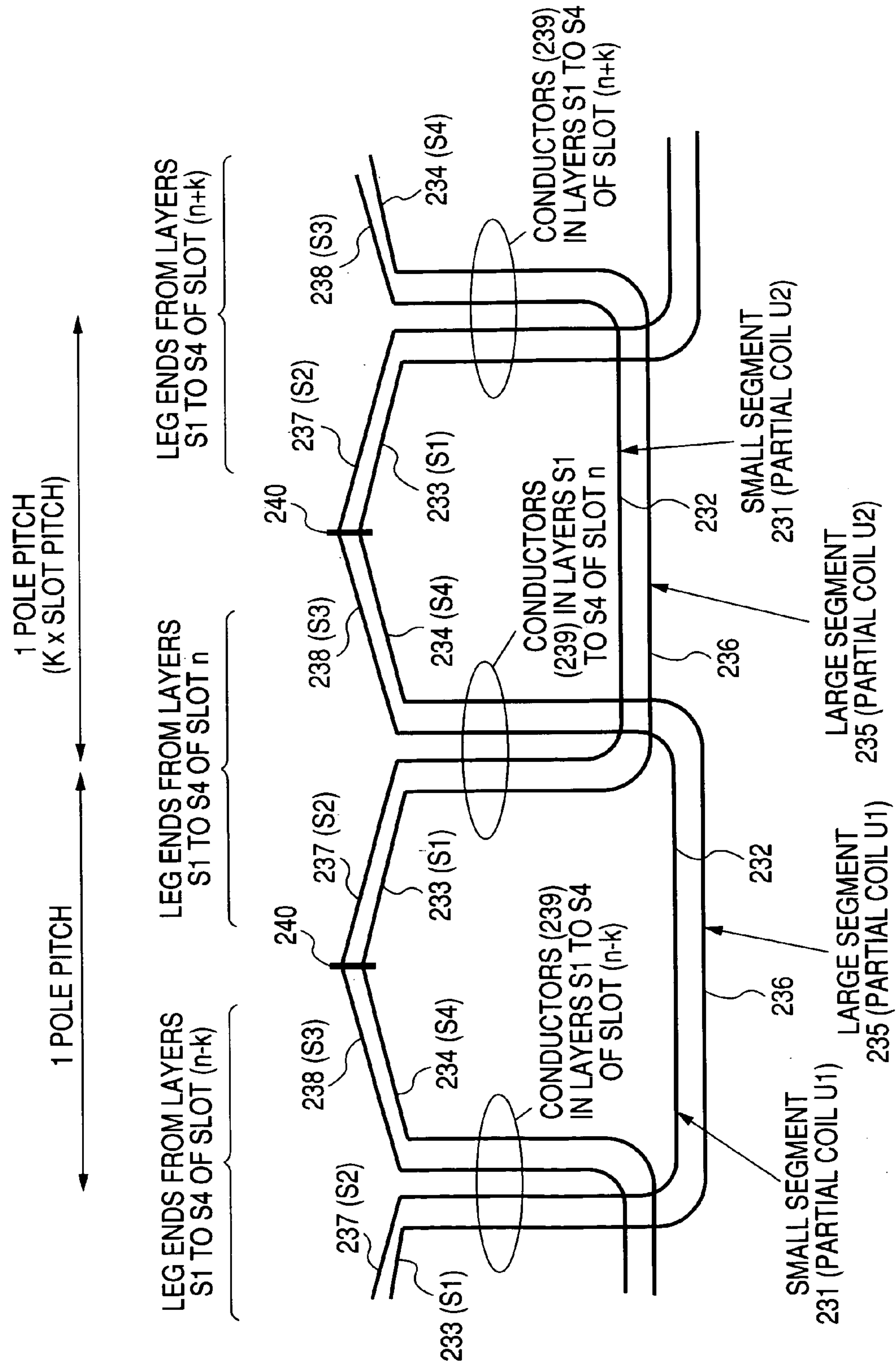
FIG. 17
1 POLE PITCH
1 POLE PITCH
(K x SLOT PITCH)
LEG ENDS FROM LAYERS
S1 TO S4 OF SLOT (n-k)
LEG ENDS FROM LAYERS
S1 TO S4 OF SLOT n
LEG ENDS FROM LAYERS
S1 TO S4 OF SLOT (n+k)
233 (S1)
237 (S2)
238 (S3)
234 (S4)
240
CONDUCTORS (239)
IN LAYERS S1 TO S4
OF SLOT (n-k)
CONDUCTORS
(239) IN LAYERS S1
TO S4 OF SLOT n
CONDUCTORS (239)
IN LAYERS S1 TO S4
OF SLOT (n+k)
232
236
SMALL SEGMENT
231 (PARTIAL COIL U1)
LARGE SEGMENT
235 (PARTIAL COIL U1)
LARGE SEGMENT
235 (PARTIAL COIL U2)
SMALL SEGMENT
231 (PARTIAL COIL U2)

4-LAYER TYPE OF STATOR WINDING FORMED OF SEQUENTIALLY CONNECTED SEGMENTS LOCATED IN RESPECTIVE SLOT PAIRS, AND METHOD OF MANUFACTURE THEREOF

This application is based on and incorporates herein by reference Japanese Patent Application No. 2004-153561 filed on May 24, 2004.

BACKGROUND OF THE INVENTION

1. Field of Application

The present invention relates to a 4-layer type of stator winding for a rotary electric machine, with the stator winding formed of respectively separate U-shaped segments, and with the ends of leg portions of the segments sequentially connected after the segments have been inserted within respective pairs of stator slots.

2. Description of the Prior Art

In the prior art, types of rotary electric machines such as 3-phase alternators for motor vehicles have been proposed, in which the armature winding (assumed in the following to be a stator winding) has a multi-layer configuration, formed of a plurality of pre-formed U-shaped winding segments (sometimes referred to as "hairpin conductors"}. The legs of each segment are inserted into a pair of slots of the stator, such that a U-shaped portion of the segment (referred to in the following as the head portion) protrudes on one side of the stator and extends between the two slots, while two outer ends of the segment (referred to in the following as the leg ends) respectively protrude from these slots on the opposite side of the stator. Each leg end is shaped by being bent in a clockwise or anti-clockwise direction (in general, after insertion into the slots) to enable connection to other segments. The part of a segment leg that is contained within a slot, as a conductor layer, will be referred to as the intra-slot portion.

Each leg end is connected to a leg end of a specific other segment, such that the segments are sequentially connected to form turns of the winding. Each intra-slot portion of a segment is located in a specific one of a plurality of layers, whose positions extend successively radially.

The assignee of the present invention has previously proposed (in Japanese patent publication number 2000-092766, referred to in the following as reference document 1) such a stator winding, having six conductor layers in each stator slot, and utilizing three sizes of segment, i.e., large, medium and small segments. However this has various disadvantages, such as the need to have a number of different types of segments, and complexity of establishing connections between the sets of six segment leg ends protruding from each slot, so that such a stator winding presents substantial manufacturing difficulties.

Based on that prior art, it would be readily possible to envisage a 4-layer sequential segment connection stator winding, having only four conductor layers per slot, and having only two types of segment, i.e., large and small. The features of such a stator winding will be described referring first to FIG. 9. The aforementioned four layers will be referred to in the following as the first layer S1, second layer S2, third layer S3 and fourth layer S4 (the first layer S1 being at the most radially inward position, and the fourth layer S4 being at the most radially outward position). The aforementioned two types of segment are designated as a small segment 50 whose legs are respectively disposed in the second and third layer positions of two stator slots, and a large segment 51, whose legs are disposed in the first and fourth layer positions, respectively, of two slots. Each of the segments is rectangular in cross-section, thereby enabling a high degree of occupancy of each stator slot by the conductors, when the intra-slot portions are stacked in successive radially extending layers.

As shown, each of the leg ends of a segment is shaped by being bent appropriately for connection to a leg end of another segment.

This can be more readily understood from the partial oblique view of a completed stator winding shown in FIG. 12, showing the interconnections between the tip portions of pairs of leg ends of respective segments. In FIG. 12, the layer positions of the segment intra-slot portions that correspond to these tip portions are respectively indicated.

FIG. 10 is a conceptual winding diagram which illustrates the interconnection configuration of a set of segments which form one phase winding of this stator winding, with the numbers 8, 17, etc., being respective numbers of the stator slots containing the intra-slot portions of the segments (e.g., with slots 8 and 17 differing in circumferential position by nine slot pitches). In FIG. 10, and also in FIG. 11 described hereinafter, each set of conductors (intra-slot portions) shown corresponding to one slot are arranged in the drawing with the respective successive positions of these conductors, from the left to right sides, corresponding to their respective layer positions within the slot, that is to say with the leftmost conductor being in the first layer position and the rightmost conductor being in the fourth layer position.

The leg ends of one set of the large segments and one set of the small segments are successively connected in a wave-wound configuration to form a first of two circumferentially extending windings, referred to in the following as partial coils, which have mutually opposite winding directions, while a second set of the large segments and second set of the small segments are successively connected in a lap-wound configuration to form a second partial coil. The starting end of the lap-wound partial coil is designated as 601, while the starting end of the wave-wound partial coil is designated as 602.

The respective intra-slot portions of the small segment and large segment that are connected to the starting ends 601, 602 of the two partial coils constitute the first and second layers S1, S2 of the same slot, i.e., slot number 71, as shown. The respective intra-slot portions of the small segment and large segment that are connected to the terminating ends of the two partial coils constitute the third and fourth layers S3, S4 of slot number 8.

These two partial coils can be connected in parallel to form one of the three phase windings that constitute the stator winding.

In the case of Japanese patent publication number 2002-58189, referred to in the following as reference document 2, a multi-layer sequential segment connection stator winding is described which also utilizes three sizes of segment, as for reference document 1 above. A 4-layer sequential segment connection stator winding could readily be envisaged based on reference document 2, in which a phase winding would be configured as illustrated in the conceptual winding diagram of FIG. 11. In this case, the conductors that are located in the layer positions 1 and 2 of the slots are interconnected to form two small partial coils that extend in mutually opposite directions, while similarly the conductors that are located in the layer positions 3 and 4 of the slots are also interconnected to form two small partial coils that extend in mutually opposite directions, so that there is a total of four small partial coils. Pairs of these small partial coils are connected in series to obtain two partial coils, and these can be connected in parallel to constitute one phase winding.

It should be noted that in the following, the term "4-layer sequential segment connection stator winding" is applicable also to a stator winding having a plurality of sets of four conductor layers in each stator slot, as will be made more apparent from embodiments of the invention described hereinafter (e.g., a configuration having layers that can be designated as S1, S2, S3, S4, S5, S6, S7, S8, successively extending radially from S1 to S8).

Such a 4-layer sequential segment connection stator winding configuration has the advantage of enabling a high occupancy factor for the conductors within each stator slot, so that the efficiency of utilizing the cross-sectional area within each slot can be maximized. In addition, efficient cooling of the leg ends of the segments is achieved. For these reasons, such a configuration enables a compact rotary electric machine to be produced which can be compact in size while having a having a high power rating.

However with a type of 4-layer sequential segment connection stator winding that is described in or could readily be envisaged from the prior art, the arrangement of the leg ends of the segments, and operations to connect respective pairs of leg ends (e.g., by welding) is complex, so that manufacture is difficult. Furthermore due to the fact that there be a substantial difference in potential between conductors that are located at adjacent layer positions within the same slot, it is necessary to pay careful attention to providing sufficient electrical insulation between such adjacent conductors within each slot, if the rotary electric machine is to operate with high levels of voltage being developed in (or applied to) the stator winding.

In addition, since in that case there will also be a substantial potential difference between adjacent leg ends that belong to respectively different partial coils, it is necessary to take measures to prevent corona discharge from occurring between these. For that reason, it may be necessary to provide cylinders of an electrically insulating material (e.g., paper insulation) between sets of segment leg ends that correspond to respectively different adjacent layer positions. This is illustrated in FIGS. 12 and 13, in which three cylinders of paper insulation 41 are disposed between each of adjacent sets of leg ends that respectively correspond to the four layer positions. Hence, the manufacturing difficulty is further increased. In addition, although not shown in the drawings, it may also necessary to provide a similar insulation arrangement on the other side of the stator when high-voltage operations is to be implemented, i.e., three insulation cylinders disposed between sets of segment head portions that respectively correspond to the four layer positions.

These problems arise both in the case of a stator having one slot per pole (i.e., with each pair of adjacent slots of the stator containing conductors that are of respectively different phase) and in the case of a stator winding in which sets of mutually adjacent slots each correspond to the same phase (as described in detail hereinafter), with such a set of adjacent slots being referred to herein as an "identical-phase slot set".

The above problems apply both for types of prior art 4-layer sequential segment connection stator winding that could be envisaged from the prior art of reference document 1 or from the prior art of reference document 2.

Reference document 1 describes a 6-layer sequential segment connection stator winding stator winding in which the intra-slot portions of the large segments constitute the first and sixth conductor layers of each stator slot, the intra-slot portions of the small segments constitute the third and fourth layers, and the intra-slot portions of the intermediate-size segments constitute the second and fifth layers. Theoretically it would be possible to apply the principles described in reference document 1 to produce a 8-layer sequential segment connection stator winding, or a 10-layer sequential segment connection stator winding. However such configurations having more than 4 layers per slot each have the disadvantages (in addition to those described hereinabove of a 4-layer sequential segment connection stator winding derived based on the prior art) that the axial length of the stator winding is increased, due to an increased degree of protrusion of the sequentially connected leg ends, and that it is necessary to use a greater number of different types of segment. Hence, such types of stator winding configuration are less practicable than a 4-layer sequential segment connection stator winding.

SUMMARY OF THE INVENTION

It is an objective of the present invention to overcome the above problems of the prior art, by providing a 4-layer sequential segment connection stator winding, preferably in which stator conductors having a rectangular cross-sectional shape are utilized, with the conductors being disposed as successive layers within each stator slot, whereby greater ease of manufacture can be achieved, whereby the extent of axial protrusion of the stator winding is reduced, and whereby requirements for electrical insulation between mutually adjacent stator conductors are made less severe.

To achieve the above objectives, according to a first aspect the invention provides such a stator winding, in which each phase winding comprises an even number of identical-phase single-turn partial coils (i.e., which each extend substantially entirely circumferentially around the stator), each partial coil comprising plural U-shaped large segments and small segments. Each large segment has two legs that are disposed as first and fourth conductor layers respectively within a pair of stator slots that are circumferentially separated by one pole pitch, with leg ends corresponding to the first and fourth conductor layers protruding from these slots, and each small segment has two legs that are disposed as second and third conductor layers respectively within a pair of slots of the stator that are also separated by one pole pitch, with leg ends corresponding to the second and third conductor layers protruding from these stator slots. Such a phase winding according to the present invention is characterized in that:

(a) each adjacent pair of leg ends corresponding to the first and second conductor layers are mutually connected, to be at an identical potential, and are bent in an identical direction (i.e., clockwise or anticlockwise), such as to position respective tip portions of these leg ends appropriately for being connected to leg ends of other segments, and similarly, each adjacent pair of leg ends corresponding to the third and fourth conductor layers are mutually connected, to be at an identical potential, and are bent in an identical direction (opposite to that of the leg ends from the first and second conductor layers), such as to position respective tip portions of these leg ends appropriately for being connected to leg ends of other segments, and (b) a pair of the partial coils are made up a first partial coil that is formed as a wave-wound coil comprising, within each of respective stator slots, a mutually adjacent pair of the first, second, third and fourth conductor layers, and a second partial coil, also formed as a wave-wound coil, which comprises, within each of these respective stator slots, a remaining mutually adjacent pair of the first, second, third and fourth conductor layers.

Each partial coil is formed of a series of parallel-connected pairs of large/small segments, i.e., with the segments of each pair being at identical potentials. Thus, the requirements for electrical insulation between such a pair of segments are minimized, even if the stator winding is in a condition of high-voltage operation.

Within each stator slot, if the partial coils are to operate with substantial potential differences between them, electrical insulation material such as insulating paper can be disposed to separate the conductors of the second and third layers (which form part of respectively different partial coils). However with the present invention, it becomes unnecessary to provide any special electrical insulation material between the first and second conductor layers within each stator slot, or between the third and fourth conductor layers in each slot, such as would be required in the prior art.

Similarly, when the stator winding is to operate at high voltages, it is unnecessary to provide any special electrical insulation material between each of adjacent head portions of such a parallel-connected pair of large/small segments, protruding from one end of the stator winding, or (at the other end of the stator winding, i.e., the coil connection end) between each pair of segment leg ends of such a parallel-connected pair, protruding from the first and second layers of a slot, or between the other pair of leg ends of such a pair, protruding from the third and fourth layers of the slot.

The fact that such insulation measures are unnecessary enables simplification of operations to connect (e.g., by welding) each pair of leg ends corresponding to the first and second conductor layers within a stator slot, or the pair that correspond to the third and fourth layers of a slot, and to connect each such pair of leg ends to a succeeding pair of leg ends of another segment pair. As a result, manufacture of each partial coil, and hence manufacture of the entire stator winding, is substantially simplified by comparison with manufacturing operations for a prior art type of stator winding that is formed of successively connected segments.

Specifically, in forming a partial coil of a stator winding according to the present invention, the leg ends corresponding to the first and second conductor layers within each stator slot are connected to leg ends of a pair of segment legs corresponding to the third and fourth conductor layers within a second stator slot that is circumferentially distant by an amount substantially equal to one pole pitch.

Furthermore a stator winding according to the present invention can be advantageously configured such that a starting end of one partial coil is connected to an initial large/small segment pair of that partial coil at the first and second layers of a specific stator slot, while the starting end of a second partial coil is connected to an initial large/small segment pair of that partial coil at the third and fourth layers of that specific stator slot. In that way, the terminating ends and the leading ends of both of these partial coils will emerge from three successively adjacent identical phase stator slots (i.e., respectively separated by one pole pitch). Hence, the partial coils can readily be connected in parallel or in series, as required, by connecting appropriate crossover (i.e., special-shape) segments between the ends of the partial coils. Thus, the manufacture process is further simplified.

In general, such a rotary electric machine has a plurality of slots per pole, so that the stator slots consist of successive sets of two or more respectively adjacent identical-phase slots. However the advantages described above are obtained irrespective of the number of slots in each identical-phase slot set. If there are m slots in each such set (where m is a natural number equal to 1 or higher), then the total number of partial coils will be 2 m. These can be connected in series or in parallel, as required, by using appropriate crossover segments.

Furthermore, it is also possible to provide more than one set of four conductor layers in each slot (each being as described above for the case of a single set of four layers). In that case, if each set of identical-phase stator slots (as defined above) contains m slots, and each slot contains **4*n*** conductor layers (where n and m are natural numbers and n is equal to 2 or higher), then there will be a total of 4 nm partial coils. As described herein referring to preferred embodiments, these partial coils can be readily interconnected to form a single phase winding, by utilizing appropriate crossover segments.

It is another advantage of the present invention that shaping of the leg ends of respective segments, in a stator winding as described above, can be readily performed. Specifically, to shape the conductors of a phase winding, each of the segments are first inserted with their legs in a straight condition, into a respective predetermined pairs of the stator slots, at respective predetermined layer positions, so that each leg will constitute the first, second, third or fourth conductor layer within a specific slot.

Each of the pairs of leg ends corresponding to the first and second conductor layers of each slot corresponding to that phase are then bent in a first circumferential direction, to displace respective tip portions of the leg ends by an amount substantially equal to one half of the pole pitch. Similarly, each of respective pairs of leg ends corresponding to the third and fourth conductor layers in each slot corresponding to that phase are bent in the opposite circumferential direction, to displace respective tip portions of the leg ends by an amount substantially equal to a half pole pitch. Respective pairs of leg ends corresponding to the first and second layers and corresponding to the third and fourth layers are thereby brought into proximity, and so can be readily connected, e.g., by welding.

Thus, the manufacturing operations to connect successive large/small segment pairs to form a phase winding can be simple.

According to another aspect, the invention provides a 4-layer sequential segment connection stator winding in which each phase winding is formed of at least one wave-wound coil that is formed of a succession of large/small segment pairs, but in which the large segments and small segment constitute a first segment group and a second segment group, with each large segment of the first segment group having its legs disposed as the first and fourth conductor layers respectively within a predetermined pair of stator slots (mutually separated by one pole pitch) and each small segment of the first segment group similarly having its legs disposed as the second and third conductor layers respectively within a predetermined pair of stator slots (mutually separated by one pole pitch). Similarly, each large segment of the second segment group has its disposed as the fifth and eighth conductor layers respectively within a predetermined pair of stator slots, and each small segment of the second segment group has its legs disposed as the sixth and seventh conductor layers respectively within a specific pair of stator slots. Each of the above-mentioned stator slots, of course, belong to the same phase.

In this case, each set of four leg ends corresponding to the first, second, third and fourth conductor layers of a stator slot are mutually connected and are connected to a set of four leg ends corresponding to the fifth, sixth, seventh and eighth conductor layers of a circumferentially adjacent identical-phase stator slot (i.e., which is distant by one pole pitch). In that way, the phase winding is formed as a single-turn wave-wound coil, that is made up of two wave-wound 1-turn coils that are connected in parallel (with each 1-turn coil formed of successive parallel-connected large/small segment pairs).

This configuration has the advantage of ease of manufacture, since, for each phase winding, shaping the segment leg ends (after the set legs have been inserted, in a straight condition, into the appropriate slot pairs at the appropriate layer positions) is performed simply by bending all of the leg ends protruding from the first to fourth conductor layers in one circumferential direction, such as to circumferentially move each tip portion of each leg end by an amount equal to one-half pole pitch, and to similarly bend all of the leg ends protruding from the fifth to eighth conductor layers by the same amount in the opposite direction. Respective pairs of sets of four tip portions of the leg ends are thereby oriented mutually adjacent, so that welding to connect these can be readily performed.

The above features and advantages will be made more apparent by the following description of preferred embodiments.

BRIEF DESCRIPTION OF THE DRAWINGS

FIG. 17 is a conceptual winding diagram showing details of a first partial coil and second partial coil which are connected to constitute a phase winding in the first embodiment.

DESCRIPTION OF PREFERRED EMBODIMENTS

Figure 1:
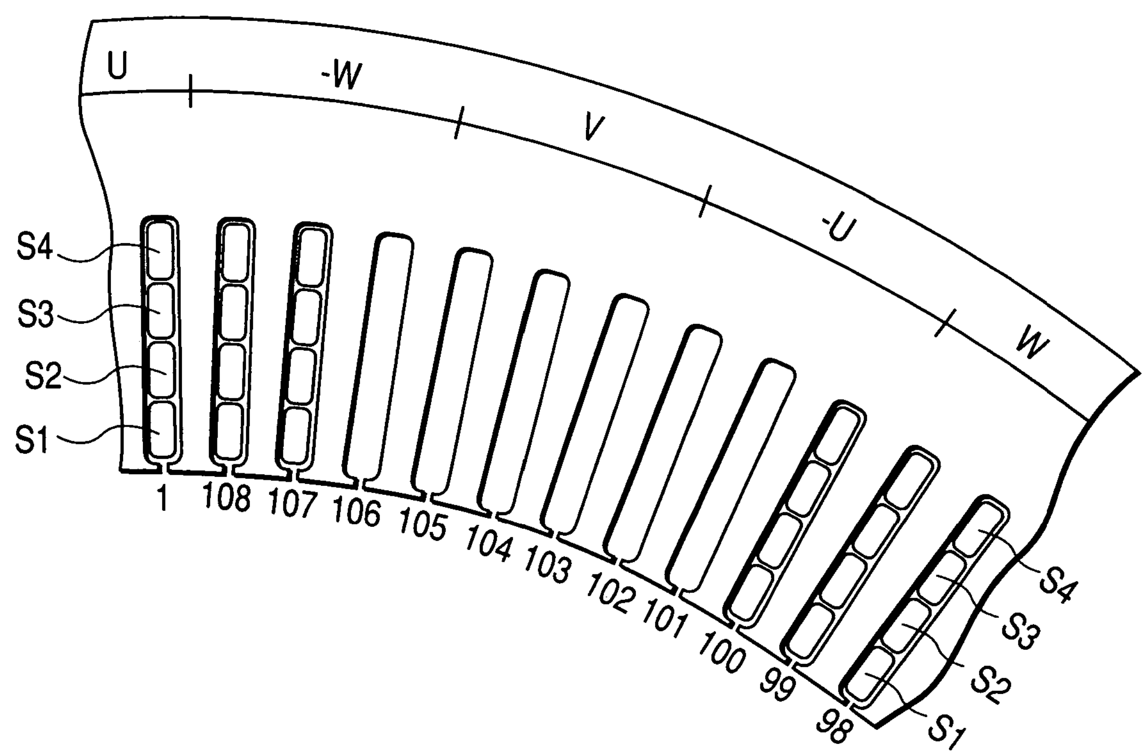
FIG. 1 is a partial cross-sectional view of a stator formed with a 4-layer sequential segment connection stator winding, of a first embodiment.

Embodiments of a 4-layer sequential segment connection stator winding according to the present invention will be described in the following referring to the drawings. However it should be noted that the invention is not limited to these embodiments, and that various modifications and/or combinations of the features of these embodiments could be envisaged, which lie within the scope claimed for the present invention as set out in the appended claims. Each of the embodiments is a stator winding of a 3-phase rotary electric machine, such as a 3-phase alternator.

In those drawings which show wiring diagrams of embodiments, head portions of segments are indicated as broken lines, i.e., are assumed to be located at the opposite side of the stator from its coil connection side, while the segment leg ends (at the coil connection side) are indicated by full lines. In addition, unless otherwise indicated, only the conductors of one of the three phases is shown, and only the manner of constituting one of the three phase windings is described. Furthermore, in the following description and in the appended claims, the term "1-turn coil" is used to signify a set of serially-connected conductors which extends substantially around the entire circumference of the stator. In addition, the term "connected" as applied to pairs of segment leg ends in the following description and in the appended claims is to be understood as signifying "joined together and mutually electrically connected".

First Embodiment

FIG. 1 is a partial view of a stator of a 3-phase 12-pole rotary electric machine, having a first embodiment of a stator winding formed thereon. As indicated, the stator core has a total of 108 slots, so that there are 9 slots per pole, so that the pole pitch is nine times the slot pitch and there are three slots per pole. In that way, there are 36 sets of 3 mutually adjacent identical-phase slots, such as the slots 106 to 108. Such a set will be referred to in the following as an identical-phase 3-slot set.

In each slot, there are four layers S1, S2, S4, S3 at successive radial positions (referred to as the first, second, third and fourth conductor layers in the following) as shown, with conductor each layer consisting of a single intra-slot portion of a segment, and layer S4 being the outermost layer.

Each of the segment intra-slot portions is covered with a thin layer of electrical insulation material.

Figure 2:
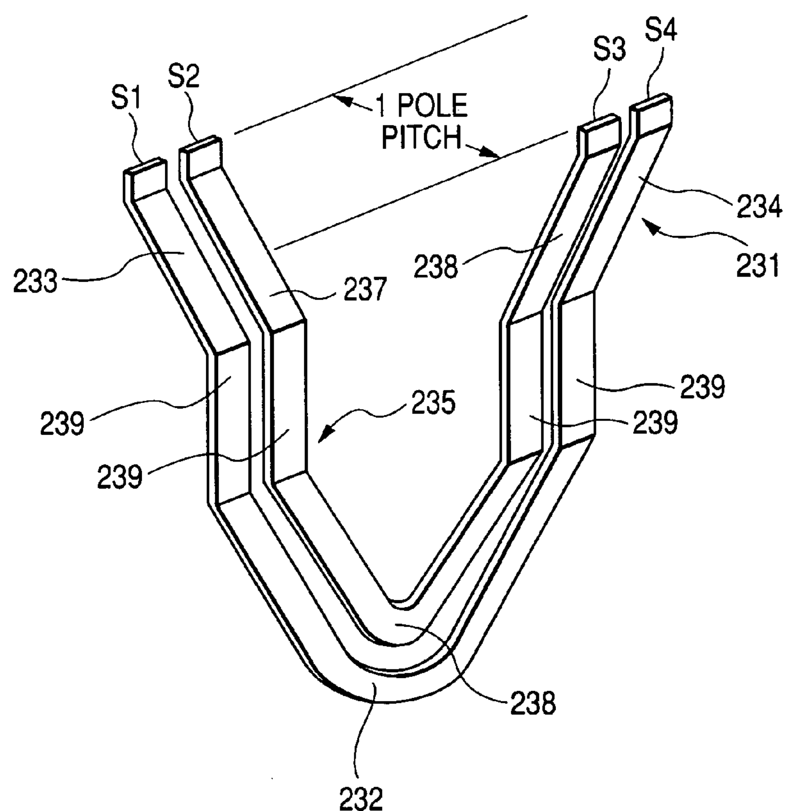
FIG. 2 is a conceptual oblique view of a large segment and a small segment which are utilized in the first embodiment, with the segment leg ends in a shaped condition.

This embodiment utilizes two forms of segment, whose configurations (when in a condition of having been inserted into slots in the stator, and shaped for connection to other segments as described hereinafter) are illustrated in the oblique view of FIG. 2. These are a large segment 231 and a small segment 235. Each segment is rectangular in cross-section, and has the legs thereof formed with two straight portions 239, which constitute the aforementioned intra-slot portions, and are spaced apart by a distance equivalent to one pole pitch (i.e., 9 times the slot pitch). The large segment 231 has two leg ends 233, 234, extending from respective intra-slot portions 239, and the small segment 235 similarly has leg ends 237, 238, extending from respective intra-slot portions 239 of that segment. The intra-slot portions 239 of a large segment 231 respectively extend from a U-shaped head portion 232, which protrudes from the opposite side of the stator core to that of the leg ends. Similarly, the intra-slot portions 239 of a small segment 235 respectively extend from a head portion 236.

Within each slot of the stator core, layers S1 and S2 respectively contain an intra-slot portion of a small segment and an intra-slot portion of a large segment, while the layers S3 and S4 respectively contain an intra-slot portion of a small segment and an intra-slot portion of a large segment, with the latter small and large segment pair being different from the small and large segment pair corresponding to the layers S1 and S2.

Each of the tip portions of the leg ends 233, 234, 237, 238 are bent, as shown, into an appropriate shape for facilitating electrical connecting to tip portions of leg ends of other segments, with that connection being effected as described hereinafter.

It can thus be understood that the two intra-slot portions 239 of each large segment 231 respectively constitute the first layer S1 of one slot and the fourth layer S4 of another slot, with these two slots being separated by a circumferential distance corresponding to 9 times the slot pitch.

Similarly, the two intra-slot portions 239 of each small segment 235 respectively constitute the first layer S2 of one slot and the third layer S3 of another slot, with these two slots being separated by a circumferential distance corresponding to 9 times the slot pitch.

Thus, designating h as a natural number having a value in the range 1 to 108, when an intra-slot portion 239 of a large segment 231 constitutes the layer S1 of the $h^{th}$ slot (in the stator core of FIG. 1), then the other intra-slot portion 239 of that segment constitutes the layer S4 of the $(h+=9)^{th}$ slot. Similarly, when an intra-slot portion 239 of a small segment 235 constitutes the layer S2 of the $h^{th}$ slot, then the other intra-slot portion 239 of that small segment 235 constitutes the layer S3 of the $(h+9)^{th}$ slot.

It is a further basic feature of this embodiment that the same potential is applied to each of respective large and small segments 231, 235 that are located in the same pair of slots. Specifically, each slot contains two intra-slot portions 239 of a first such parallel pair of large and small segments, e.g., with these two intra-slot portions constituting the S1 and S2 layers respectively of that slot and being at an identical potential, while the slot also contains the contains two intra-slot portions 239 of a second such parallel pair of large and small segments, e.g., with these intra-slot portions constituting the S4 and S3 layers respectively of that slot and being at an identical potential, which may be substantially different from that of the intra-slot portions in the S1, S2 layers.

The tip portions of the leg ends 233, 234, 237, 238 of large segments and small segments are successively connected to form two partial coils, each extending around the circumference of the stator. Each of these partial coils is formed of a succession of parallel pairs of large and small segments, each of the form described above referring to FIG. 2. Thus within each of the stator slots, the conductors in layers S1, S2 (in combination) form part of one of the two partial coils, while the conductors in layers S3, S4 similarly form part of the other one of the two partial coils. The two partial coils are formed with a wave-wound configuration.

Furthermore with this embodiment as described above, each identical-phase slot set consists of three slots. Each of these slots contains conductors that form part of two partial coils that are of the same phase, so that there are six partial coils per phase.

Figure 3:
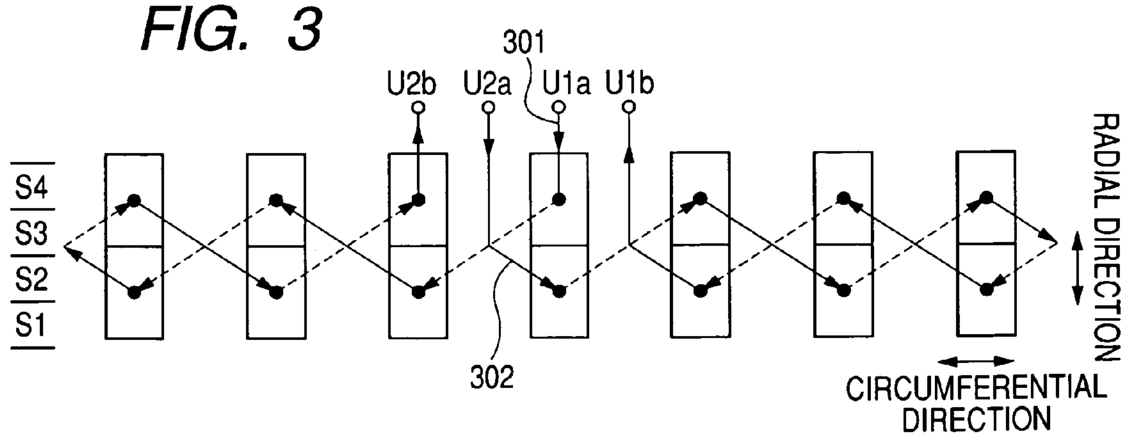
FIG. 3 is a conceptual winding diagram, for use in describing a phase winding of the first embodiment.

FIG. 3 is a conceptual wiring diagram showing part of the slots of this embodiment, to illustrate the manner in which such a pair of partial coils are arranged, with these being designated as U1 and U2 respectively. In FIG. 3, respective slots are indicated as rectangles, with the upper half of the rectangle representing a pair of layers S3, S4 and the lower half representing a pair of layers S1, S2. The stator is viewed from the side of the leg end connections, so that each full-line arrow line extending between a pair of slots (which are separated by one pole pitch) represents a connection between two pairs of leg ends of respective pairs of segments, and each broken-line arrow line represents a head portion of a segment.

The manner in which these partial coils are related can be readily understood from the conceptual winding diagram of FIG. 17, which shows how the four leg ends emerging from each slot are connected to leg ends from other slots that are of the same phase, i.e., are distant by one pole pitch.

FIG. 3 shows a part of a series of stator slots within which the two partial coils U1, U2 respectively begin and terminate. The starting and terminating ends of the partial coil U1 are respectively designated as U1*a* and U1*b*, while the starting and terminating ends of the partial coil U2 are respectively designated as U2*a* and U2

The starting end U1*a* of the partial coil U1 is connected to the pair of leg ends, designated as 301, which protrude from layers S3, S4 of a slot 501, and the terminating end U2*b* of the partial coil U1 is connected to the pair of leg ends which protrude from layers S1, S2 of a slot 502, that is separated by one pole pitch from the slot 501. Hence, the partial coil U1 is a 1-turn coil, wound in the clockwise direction.

Similarly, the starting end U2*a* of the partial coil U2 is connected to the pair of leg ends 302 which protrude from layers S1, S2 of the slot 501, and the terminating end U2*b* of the partial coil U2 is connected to the pair of leg ends which protrude from layers S3, S4 of a slot 503, that is separated by one pole pitch from the slot 501. Thus, the partial coil U2 extends around the stator circumference, from the end U2*a* to the end U2*b*, in the anticlockwise direction.

The manner in which these partial coils are related can be readily understood from the conceptual winding diagram of FIG. 17, which shows how the four leg ends emerging from each slot are connected to leg ends from other slots that are of the same phase but are circumferentially distant by one pole pitch.

With this embodiment there are three such pairs of partial coils corresponding to each phase (since each identical-phase slot set consists of 3 adjacent slots), with FIGS. 3 and 17 illustrating only one of such a set of three pairs. The six partial coils of one phase can be interconnected in various ways to constitute a single phase winding, i.e., connected in series or in parallel, so that the number of turns of the phase winding can be freely determined in accordance with design requirements.

Figure 4:
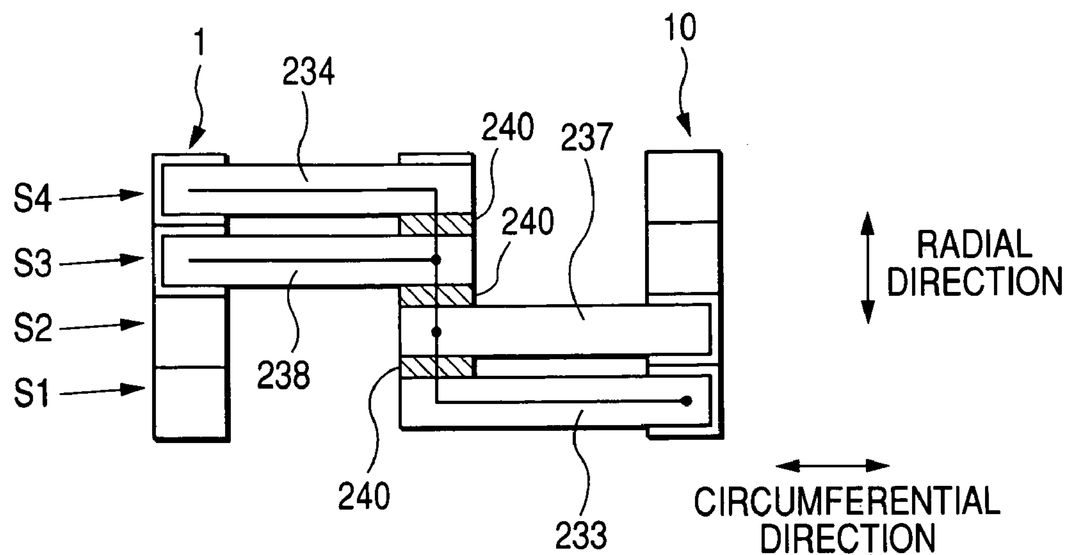
FIG. 4 is a partial side view of the first embodiment, illustrating the manner of connecting respective leg ends of adjacent pairs of large/small segments in a phase winding of the first embodiment.
Figure 5:
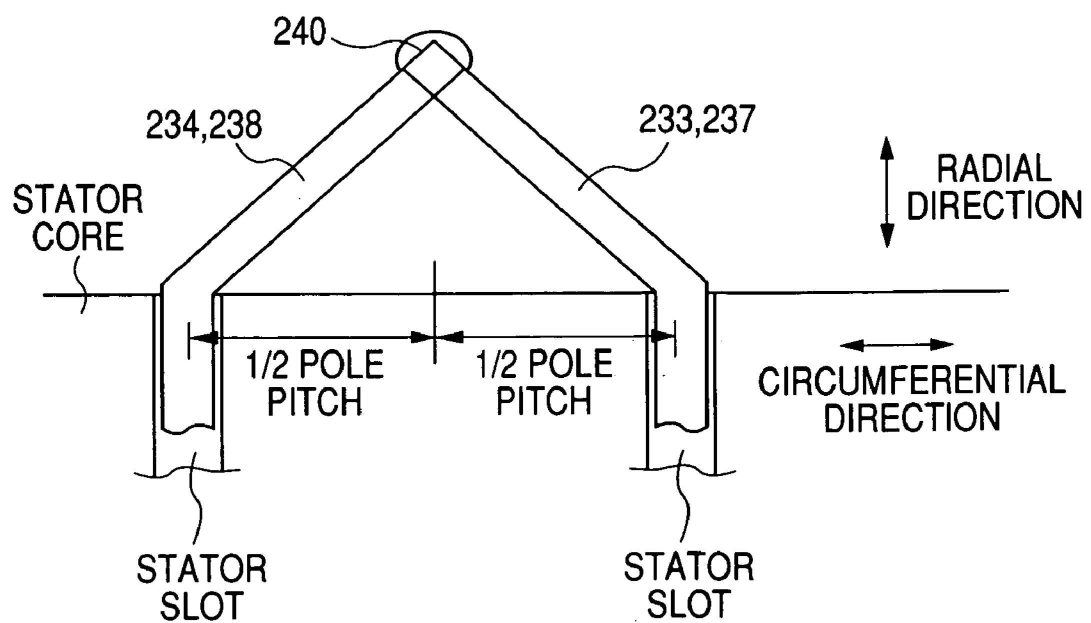
FIG. 5 is a partial view in elevation corresponding to FIG. 4.

If the partial coils U1, U2 are connected in parallel, then the advantage is obtained that there will be a reduction of the potential difference between the conductors (i.e., intra-slot portions of respective segments) in the adjacent layers S2 and S3 within a slot. Hence, the degree of electrical insulation that must be provided within each slot can be reduced FIGS. 4 and 5 are partial views in side view and plan view which conceptually illustrate the manner in which two leg ends 234, 238 of one parallel pair of small and large segments 231, 235 are connected to two leg ends 233, 237 of a second pair of small and large segments 231, 235. A first stator slot 1, from which these leg ends of the first parallel pair of segments protrude, is spaced apart by a circumferential distance of one pole pitch from a second slot 10, from which the leg ends of the second parallel pair of segments protrude, as described hereinabove. The leg ends 234, 238 of the first parallel pair of small and large segments 231, 235 protrude respectively from the layers S3, S4 of the first slot 1, while the leg ends 233, 237 of the second parallel pair of segments 231, 235 protrude respectively from the layers S1, S2 of the second slot 10, as shown in FIG. 4.

As illustrated in FIG. 5, the leg ends 234, 238 of the first parallel pair of segments 231, 235 are bent in the clockwise direction, while the leg ends 233, 237 of the second parallel pair of segments 231, 235 are bent in the anti-clockwise direction, to an extent that the respective tip portions of the leg ends 234, 238 are each displaced circumferentially in opposite directions by approximately one-half of the pole pitch, such as to mutually overlap.

In that condition, the tip portions of the leg ends 234, 238, 233, 237 are mutually connected by weld portions 240 which are successively radially located, to be thereby connected to one another.

Since each of the leg ends 234, 238, 233, 237 will always be at the same potential when the stator is in operation, it is unnecessary to provide electrical insulation between these, so that the manufacturing process is simple.

It can thus be understood that each of the partial coils which will constitute a phase winding can be formed by a simple manufacturing process, i.e., by inserting the segments in their respective slot in respectively appropriate layer positions, then bending the leg ends of the segments to the condition described above referring to FIG. 5, and then connecting together successive sets of tip portions of leg ends, by welding. The successive welding operations on the tip portions of leg ends to form each partial coil are facilitated, since it is not necessary to be careful with regard to any effects which the welding might have upon electrical insulation between each set of leg ends 234, 238, 233, 237.

As a specific example of a suitable manufacturing process, first and second rings can be utilized, with the first ring having circumferentially spaced apertures for accommodating respective pairs of leg ends protruding from the S1 and S2 layers, and a second ring having circumferentially spaced apertures for accommodating respective pairs of leg ends protruding from the S3 and S4 layers. The large and small segments (i.e., with the legs of each segment being initially in a straight condition) are inserted into their respective slots at their respective layer positions, and their protruding leg ends 234, 238, 233, 237 are then inserted into the first and second rings (i.e., which are each disposed concentric with the stator core) and retained therein. The first and second rings are each then rotated, in opposite directions, by an amount equal to half of the pole pitch. The bending of the leg ends 234, 238, 233, 237 is thereby effected by using only two rings.

The manufacturing can thus be substantially simplified by comparison with the prior art, in which it would be necessary to utilize four rings, for respectively retaining the leg ends that protrude from the four different layer positions in the slots.

Furthermore due to the fact the starting ends of each of the two partial coils are connected to respective pairs of conductor layers of the same stator slot, the terminating ends of these partial coils are connected to conductor layers of respective slots which are each separated by only one pole pitch from the starting slot. Hence, connections between respective starting and terminating ends of these partial coils, to connect these as required to form the phase winding, can be easily established. Manufacture is thereby further simplified.

Second Embodiment

A second embodiment will be described in the following, referring to the conceptual partial wiring diagram of FIG. 6. The first embodiment was described assuming that each identical-phase slot set consists of 3 adjacent slots, so that the pole pitch is nine times the slot pitch. With the second embodiment, each identical-phase slot set consists of two adjacent slots, so that the pole pitch is 6 times the slot pitch, and hence each parallel pair of a large segment and small segment extends between two slots that are spaced apart by 6 times the slot pitch.

As described for the first embodiment, the layers S1, S2 of a slot contain respective conductors of one partial coil, while the layers S3, S4 of the slot contain respective conductors of a second partial coil, with these partial coils being of the same phase. Hence, with the second embodiment, the two slots of each identical-phase slot set contain conductors of a total of four partial coils which are of the same phase. For the purpose of describing FIG. 6, the anticlockwise side slot (i.e., left-side, as seen in FIG. 6) of each identical-phase slot pair will be designated as the A-slot of that pair, and the clockwise side slot of each set will be designated as the C-slot. The pair of conductors (i.e., segment intra-slot portions) disposed in layers S3, S4 of an A-slot will be designated as pair 1, the pair of conductors disposed in layers S1, S2 of an A-slot will be designated as pair 2, and similarly, the pair of conductors disposed in layers S3, S4 of a C-slot will be designated as pair 3, and the pair of conductors disposed in layers S1, S2 of an A-slot will be designated as pair 4.

Figure 6:
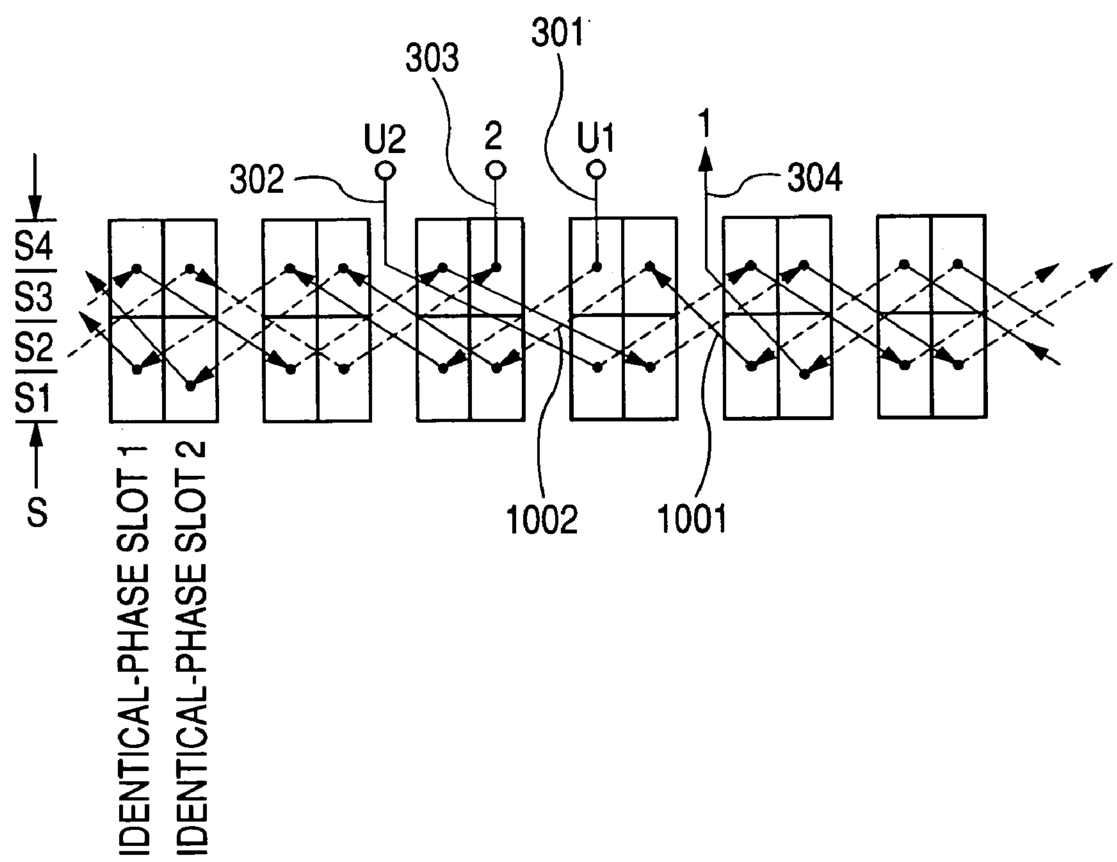
FIG. 6 is a conceptual winding diagram, for use in describing a phase winding of a second embodiment.

With the partial connection arrangement shown in FIG. 6, a first partial coil U1 having starting and terminating ends designated as U1*a*, U1*b* extends in the anti-clockwise direction around the stator, and includes a small partial coil that extends from the end U1*a* to conductor pair 1 of an A-slot, to the conductor pair 2 of an A slot, to the conductor pair of an A-slot, and so on, until a position of connection of a specially shaped segment 1001 (referred to in the following as a crossover segment) is reached, at a final A-slot that is adjacent to (i.e., spaced apart by one pole pitch) the starting A-slot of that small partial coil. The crossover segment 1001 extends, as shown, from the conductor pair 1 of the final A-slot to the conductor pair 3 of a C-slot in an adjacent (i.e., spaced apart by one pole pitch) identical-phase 2-slot set.

Thereafter, a second small partial coil proceeds, in the anti-clockwise direction, to the conductor pair 4 of a C-slot, then to the conductor pair 3 of a C-slot, and so on, until the C-slot of the terminating end U1*b* of the first partial coil U1 is reached.

In that way, a two-turn partial coil U1, which extends in the anti-clockwise direction from the starting end U1*a* to the terminating end U1*b*, is formed by series connection of two small partial coils.

The above can be conveniently represented as follows:

Partial coil U1 (anti-clockwise direction)

Starting end U1*a*→first complete turn: 1-2-1→crossover segment 1001→second complete turn: 3-4-3→Terminating end U1*b*.

In the same way, a second partial coil U2 is formed which extends in the clockwise direction. This extends from a starting end U2*a* to a terminating end U2*b*, with the two small partial coils being connected by a crossover segment 1002 as illustrated in FIG. 6, and its winding sequence can be represented as follows:

Partial coil U2 (clockwise direction)

Starting end U2*a*→first complete turn: 2-1-2→crossover segment 1002→second complete turn: 4-3-4→Terminating end U2*b*.

Although the above description has been given for the case of pairs of small partial coils being connected in series to form the partial coils U1, U2, it would of course be equally possible to connect a pair of small partial coils in parallel to form a partial coil U1 or U2. The pair of partial coils U1, U2 can similarly be connected in series or in parallel to form one phase winding, in accordance with design requirements for high voltage operation or high current operation. Each of the other two phase windings of the stator winding are similarly formed.

It can thus be understood that when each identical-phase slot set consists of a plurality of slots, respective partial coils formed by the conductors in these slots can readily be connected in series or in parallel to form a single phase winding, by utilizing crossover segments as described above.

Third Embodiment

Figure 7:
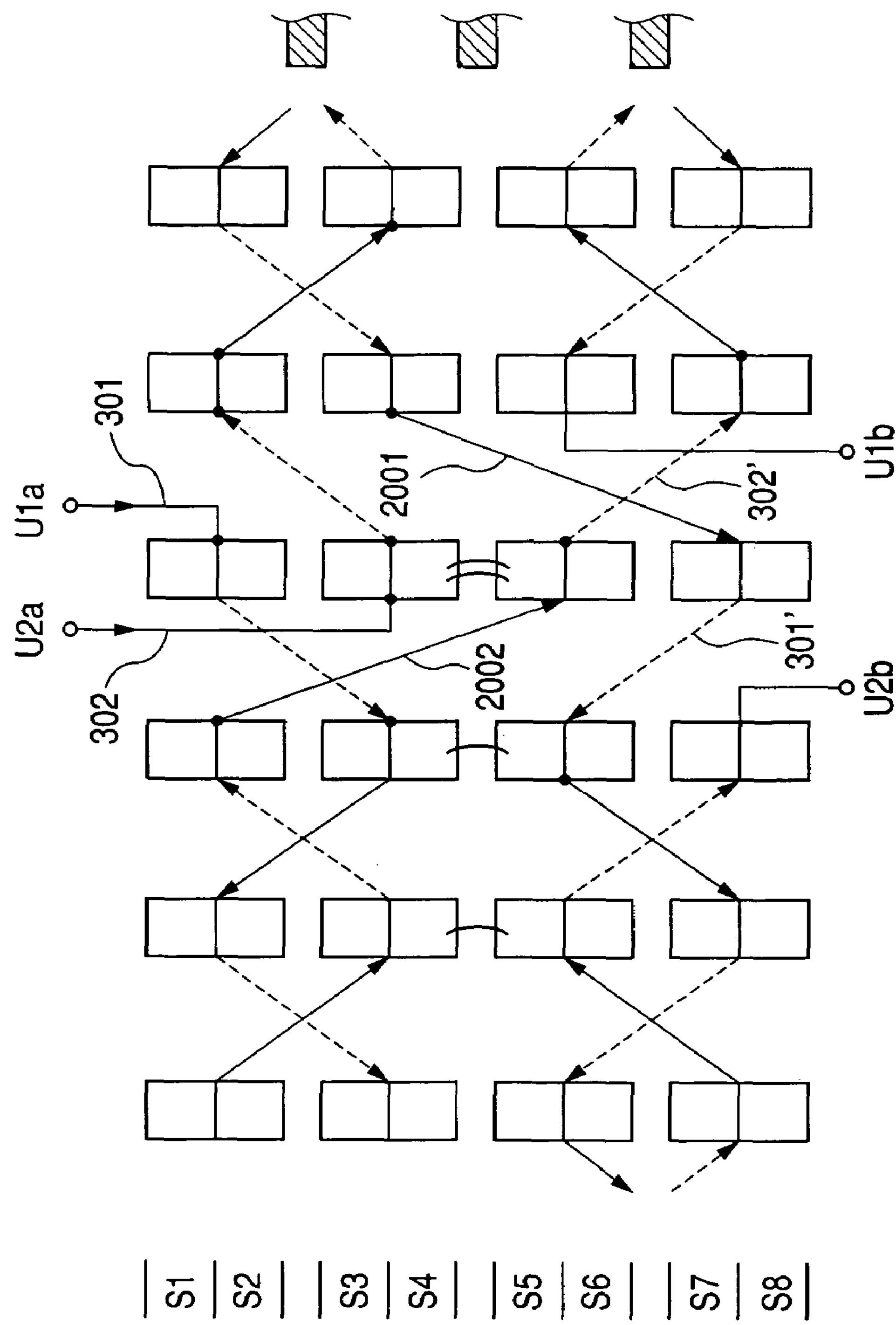
FIG. 7 is a conceptual winding diagram, for use in describing a phase winding of a third embodiment.

A third embodiment of a 4-layer sequential segment connection stator winding for a 3-phase rotary electric machine will be described referring to the conceptual partial wiring diagram of FIG. 7. With this embodiment, each identical-phase slot set consists of a single slot, i.e., the pole pitch is three times the slot pitch, so that each parallel pair of large and small segments 231, 235 extends between two slots that are spaced apart by three times the slot pitch. In addition, this embodiment differs from the previous embodiments in that there are 8 layer positions within each slot, with the successively radially extending layers designated as S1 to S8 respectively as shown in FIG. 7.

The conductors of the four layers S1 to S4 are connected to constitute a first pair of partial coils (referred to in the following as the radially inward-side partial coils) in the same way as described for the first embodiment, while the conductors of the four layers S5 to S8 are similarly connected to constitute a second pair of partial coils (referred to in the following as the radially outward-side partial coils).

The two radially inward-side partial coils are designated as 701, 702 respectively, and have respective starting ends indicated as U1*a* and U2*a*. The two radially outward-side partial coils are designated as 701', 702' (i.e., with the winding directions of the partial coils 701, 701' being identical, and the winding directions of the partial coils 702, 702' being identical, and opposite to that of the partial coils 701, 701'). The partial coils 702, 702' have respective terminating ends indicated as U1*b* and U2*b*. The terminating end of the partial coil 701 is connected to the starting end of the partial coil 301' by a crossover segment 2001. The terminating end of the partial coil 702 is connected to the starting end of the partial coil 702' by a crossover segment 2002.

A pair of two-turn partial coils are thereby formed, between the ends U1*a*, U1*b* and between the ends U2*a*, U2*b* respectively. These can be connected in series or in parallel, as described for the preceding embodiments, to form one phase winding. Each of the other two phase windings of the stator winding are similarly formed.

It would of course be equally possible to connect the partial coils 701, 701' in parallel, and similarly to connect the partial coils 702, 702' in parallel.

In that way, when a substantial number of layers of conductors (i.e., an integral multiple of 4) is disposed in each slot of the stator, and are interconnected to form a plurality of partial coils, the partial coils can readily be connected in series or in parallel by means of crossover segments, to form each of the phase windings.

Embodiment Modifications

Figure 8:
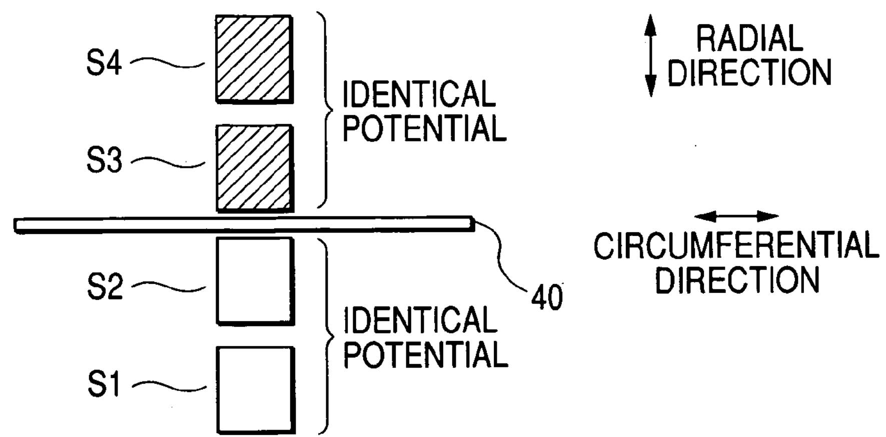
FIG. 8 is a conceptual cross-sectional view of respective adjacent pairs of leg ends of two large/small segment pairs in a phase winding, for illustrating a modification which can be applied to each of the first, second and third embodiments.
Figure 9:
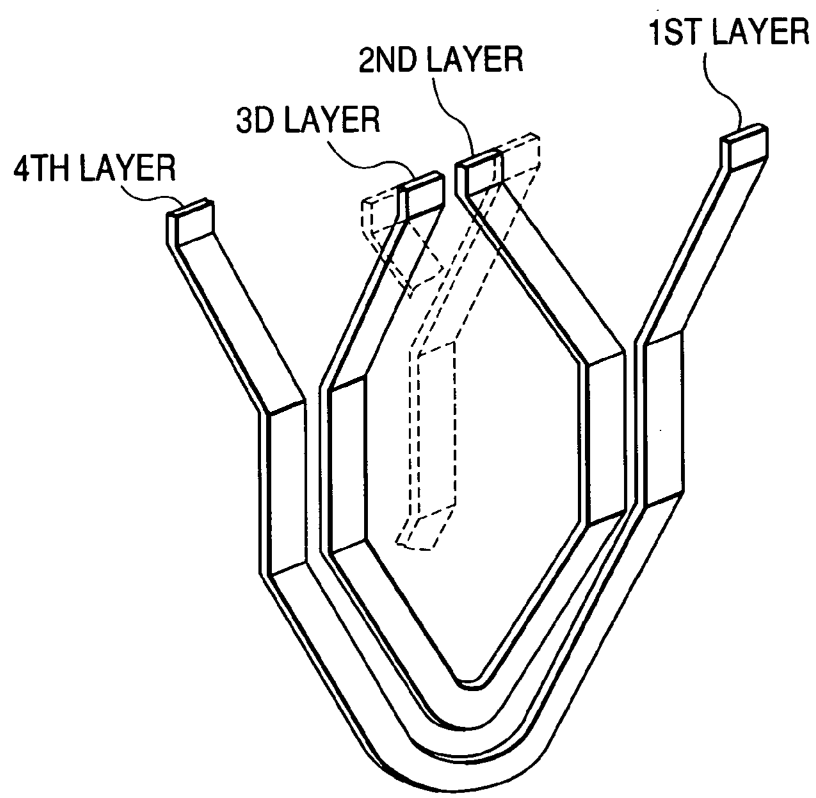
FIG. 9 is a conceptual oblique view of a large segment and a small segment which are utilized in a prior art multi-layer sequential segment connection stator winding.
Figure 10:
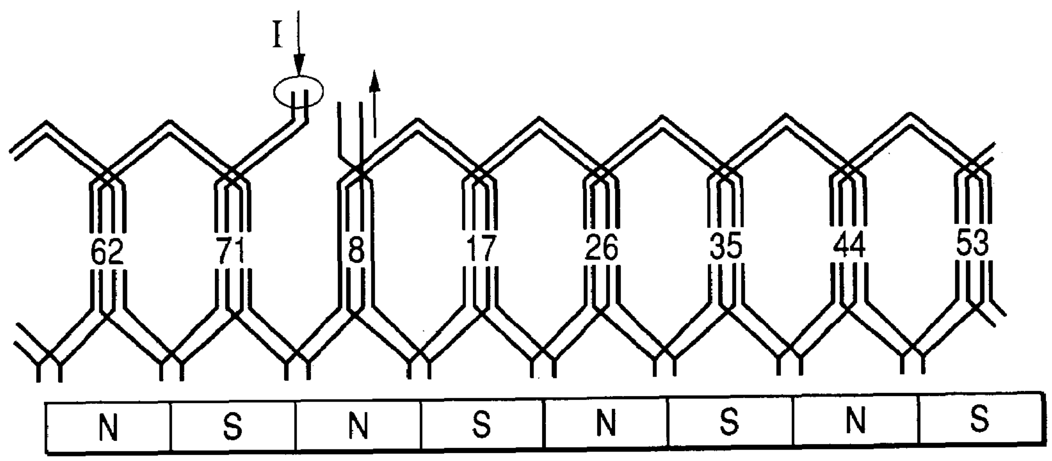
FIG. 10 is a conceptual winding diagram, for use in describing a partially lap-wound and wave-wound type of 4-layer sequential segment connection stator winding which could be derived from the prior art.
Figure 11:
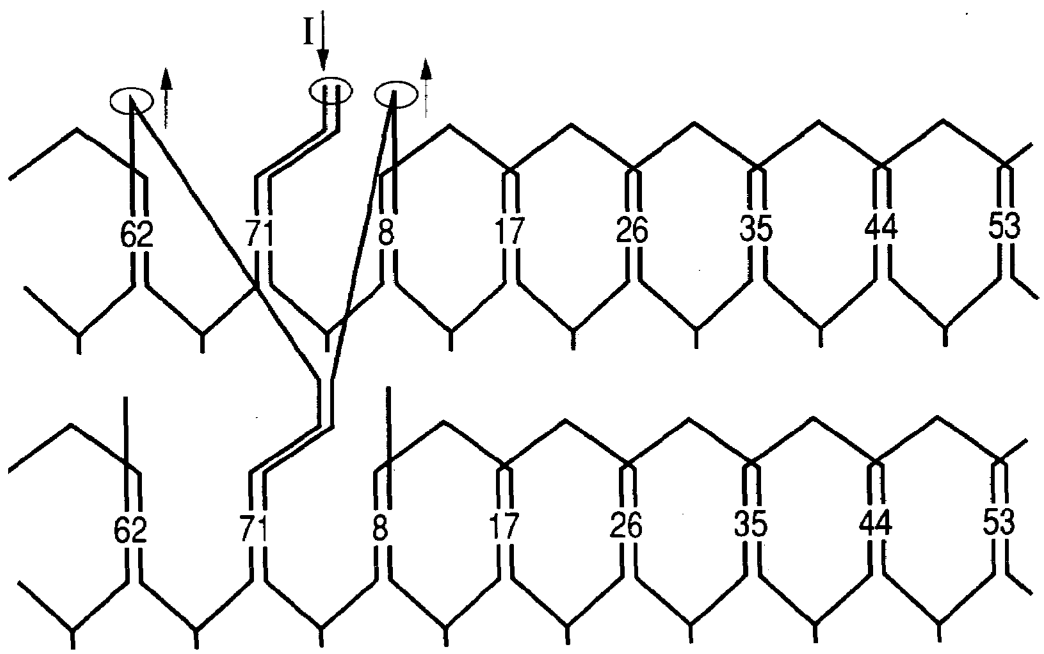
FIG. 11 is a conceptual winding diagram, for use in describing a wave-wound type of 4-layer sequential segment connection stator winding which could be derived from the prior art.
Figure 12:
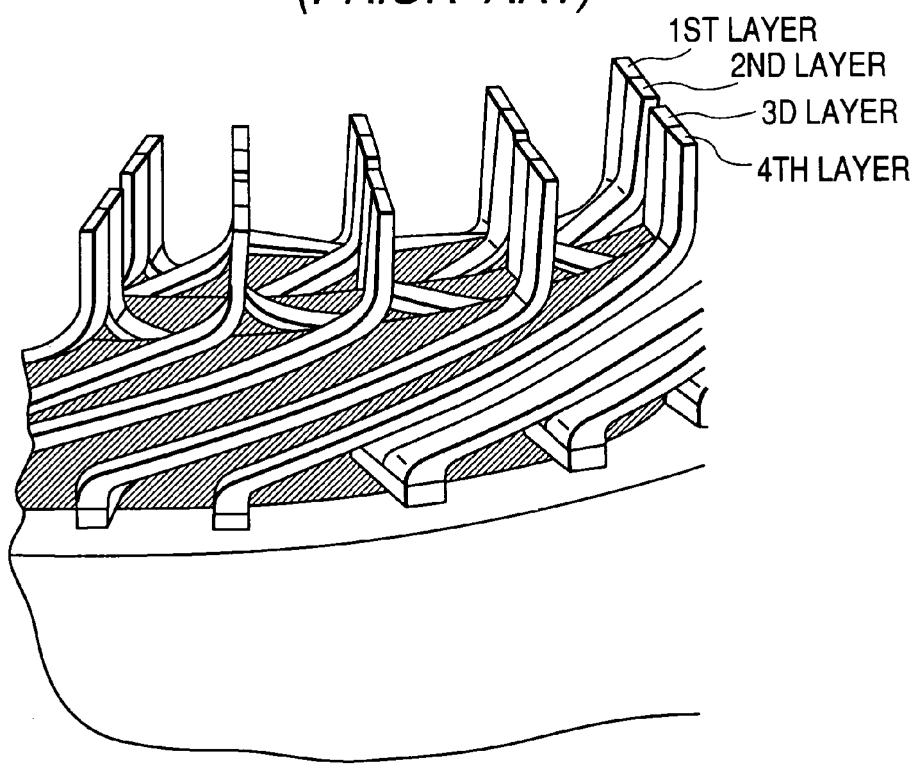
FIG. 12 is a partial oblique view of successively connected sets of segment leg ends in a prior art type of 4-layer sequential segment connection stator winding which is for high-voltage operation.
Figure 13:
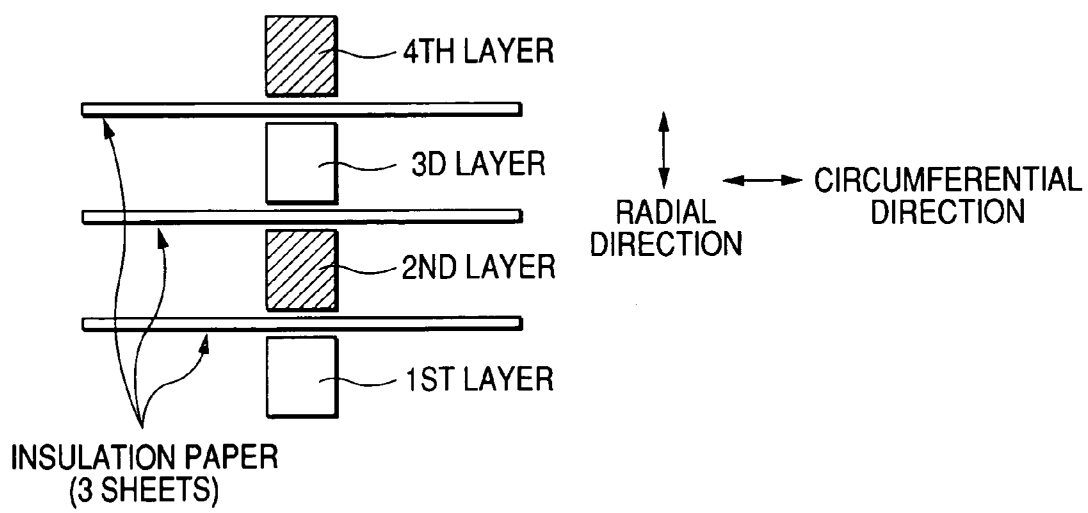
FIG. 13 is a conceptual cross-sectional view corresponding to FIG. 12.

In the case of a rotary electric machine which is to operate with high levels of potential difference between respective identical-phase partial coils of the stator winding, it would be possible to modify any of the first, second and third embodiments as shown in FIG. 8 by disposing a layer of electrical insulation material 40, such as insulating paper, between the leg ends of conductors that are located in the second and third layers S2 and S3 of each slot. Occurrence of corona discharge between segment leg ends that belong to respectively different partial coils can thereby be effectively prevented. Such a layer of electrical insulation material would be of cylindrical form, disposed concentric with the stator core, as described hereinabove for the prior art referring to FIG. 13. However with the present invention, as opposed to that prior art example, it becomes unnecessary to provide such electrical insulation between the layers S1 and S2, or between the layers S3 and S4, since each pair of leg ends corresponding to the conductors of layers S1 and S2 are at the same potential, and this is also true for each pair of leg ends corresponding to the layers S4 and S3.

Similarly, on the other side of the stator winding (i.e., on the opposite side to the leg end connection side) a cylinder of insulation paper can be disposed to separate the segment head portions that correspond to conductors in layers S1, S2 of each slot from the segment head portions that correspond to conductors in layers S3, S4 of the slot, to thereby prevent corona discharge between adjacent head portions when the stator winding is to be operated at a high voltage. However with the present invention, it is not necessary to provide such insulation paper disposed to mutually separate the segment head portions corresponding to the conductor layers S1 and S2 of each slot, or to mutually separate the segment head portions corresponding to the conductor layers S3 and S4 of each slot. Thus, manufacture is simplified by comparison with the prior art.

It should be noted that with each of the first, second and third embodiments, identical-phase partial coils can be connected in series or in parallel in various possible ways (e.g., by utilizing appropriate crossover segments as described above), to form a phase winding having a desired number of turns. Hence, the stator winding can be freely configured in accordance with design requirements.

Fourth Embodiment

A fourth embodiment will be described referring to FIGS. 14 and 15. In the same way as for the previous embodiments, only a part of a phase winding that is constituted by conductors in one slot of each identical-phase slot set (as defined hereinabove) will be described. With this embodiment there are a total of eight conductor layers (i.e., respective segment intra-slot portions), respectively designated as S1 to S8, in each slot of the stator, with layer S1 being the most radially inward layer and layer S8 being the most radially outward layer. Each segment has the intra-slot portions thereof constituting either two of the layers S1 to S4 of respective slots, or two of the layers S5 to S8 of respective slots. Those segments whose intra-slot portions are disposed in the layers S1 to S4 will be referred to as the first segment group, while the segments whose intra-slot portions are disposed in the layers S5 to S8 will be referred to as the second segment group.

Specifically, when a large segment of the first segment group has one intra-slot portion thereof disposed as layer S1 of a slot x, the other intra-slot portion of that segments is disposed as layer S4 of a slot that is separated from slot x by one pole pitch. When a small segment of the first segment group has one intra-slot portion thereof disposed as layer S2 of slot x, the other intra-slot portion of that segments is disposed as layer S3 of a slot that is separated from slot x by one pole pitch.

Figure 14:
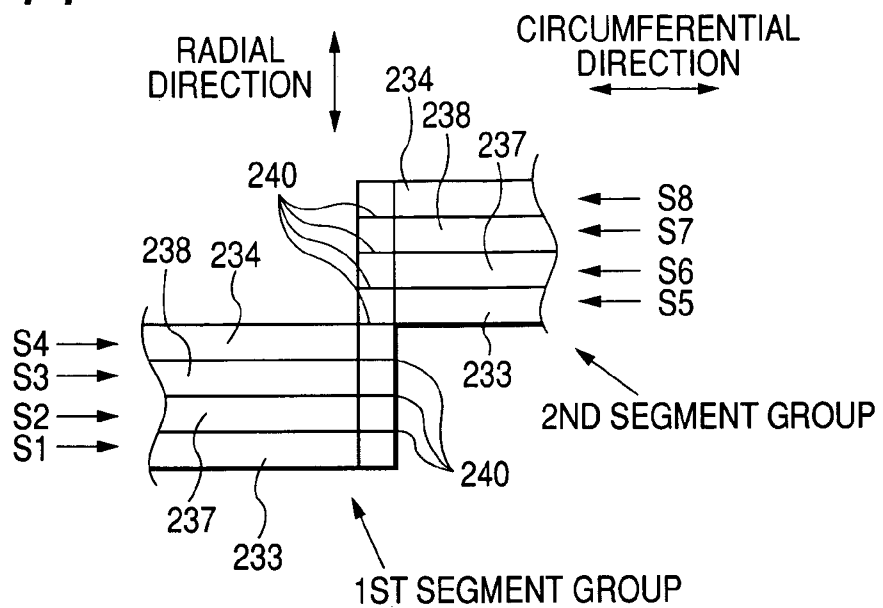
FIG. 14 is a partial conceptual side view of a fourth embodiment, illustrating a manner of connecting successive sets of leg ends of large and small segment pairs to constitute a phase winding.

FIG. 14 is a partial plan view illustrating the manner of interconnection between respective leg ends of segments of the first group, protruding from the layers S1 to S4, and respective leg ends of segments of the second group, protruding from the layers S5 to S8. As can be understood from FIG. 14, each of the respective sets of four leg ends of segments of the first group are shaped by being bent in the clockwise direction.

On the other hand, when a large segment of the second segment group has one intra-slot portion thereof disposed as layer S5 of a slot x, the other intra-slot portion of that segments is disposed as layer S8 of a slot that is separated from slot x by one pole pitch. When a small segment of the second segment group has one intra-slot portion thereof disposed as layer S6 of slot x, the other intra-slot portion of that segments is disposed as layer S7 of a slot that is separated from slot x by one pole pitch.

As shown in FIG. 14, each of the respective sets of four leg ends of the segments of the second group are shaped by being bent in the anticlockwise direction. The tip portions of each set of four leg ends of segments of the first group and of a set of four leg ends of segments of the second group are mutually connected by seven weld portions 240.

The manner of connecting the leg ends of segments of the first group and leg ends of segments of the second group will be described referring to FIGS. 14 and 15. With this embodiment, in the case of the segments which are in the first segment group, one leg end 233 of a first large segment, one leg end 237 of a first small segment, one leg end 238 of a second small segment, and one leg end 234 of a second large segment (with each of these leg ends respectively corresponding to the layers S1, S2, S3, S4 of the same slot, which is not shown in the drawings) are bent in the clockwise direction, to the position illustrated in FIG. 14.

Similarly, in the case of the segments which are in the second segment group, e.g., the uppermost set of 4 leg end as seen in FIG. 14, one leg end 233 of a first large segment, one leg end 237 of a first small segment, one leg end 238 of a second small segment, and one leg end 234 of a second large segment (with each of these leg ends respectively corresponding to the layers S1, S2, S3, S4 of the same slot) are each bent in the anticlockwise direction, to the position illustrated in FIG. 14.

Figure 15:
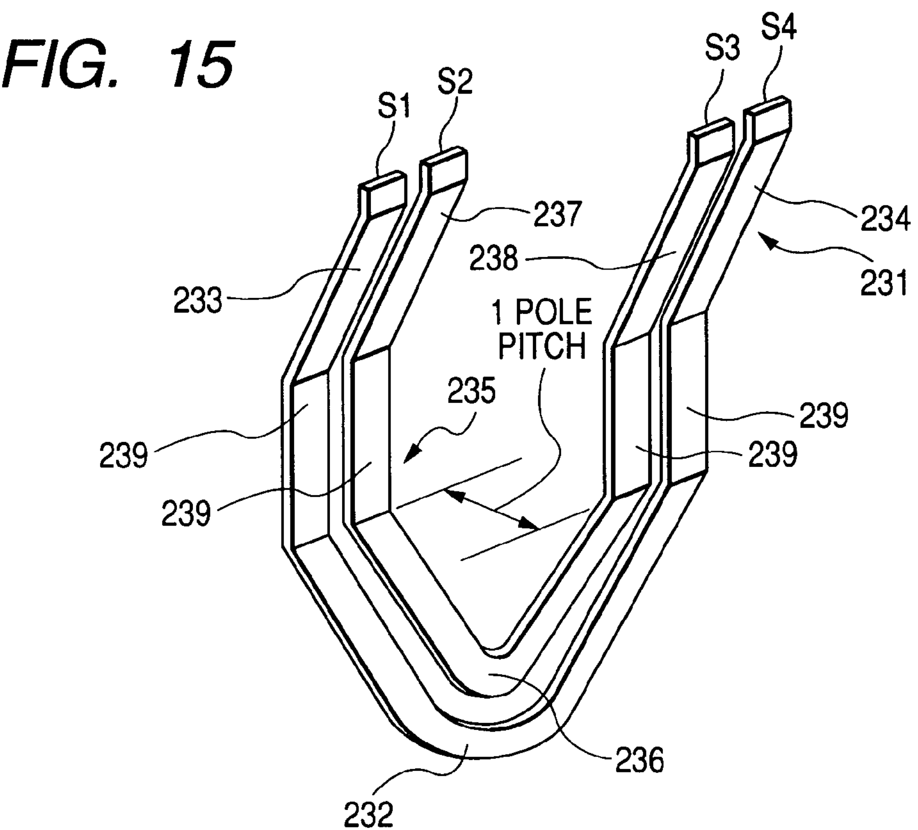
FIG. 15 is a conceptual oblique view of a large segment and a small segment which are utilized in the fourth embodiment, showing the segment leg ends in a shaped condition.

Thus as illustrated in FIG. 15, the intra-slot portions 239 corresponding to the leg ends 233, 237 of a pair of parallel-connected large/small segments 231, 235 are separated by one pole pitch from the intra-slot portions 239 corresponding to the leg ends 234, 238 of that segment pair.

Figure 16A:
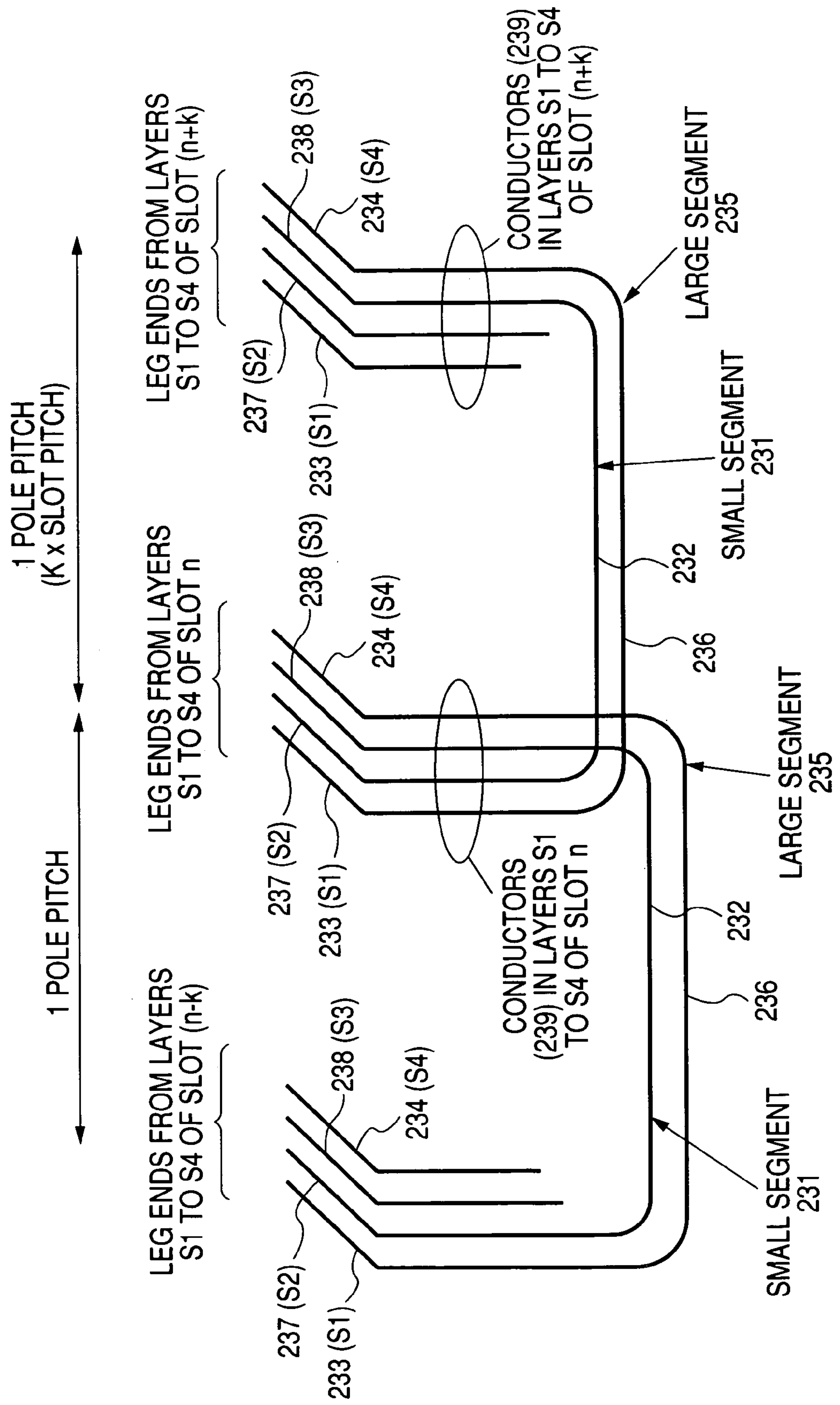
FIG. 16A is a conceptual winding diagram illustrating the relationship between successive large/small segment pairs and sets of leg ends corresponding to the first to fourth conductor layers of a stator slot.
Figure 16B:
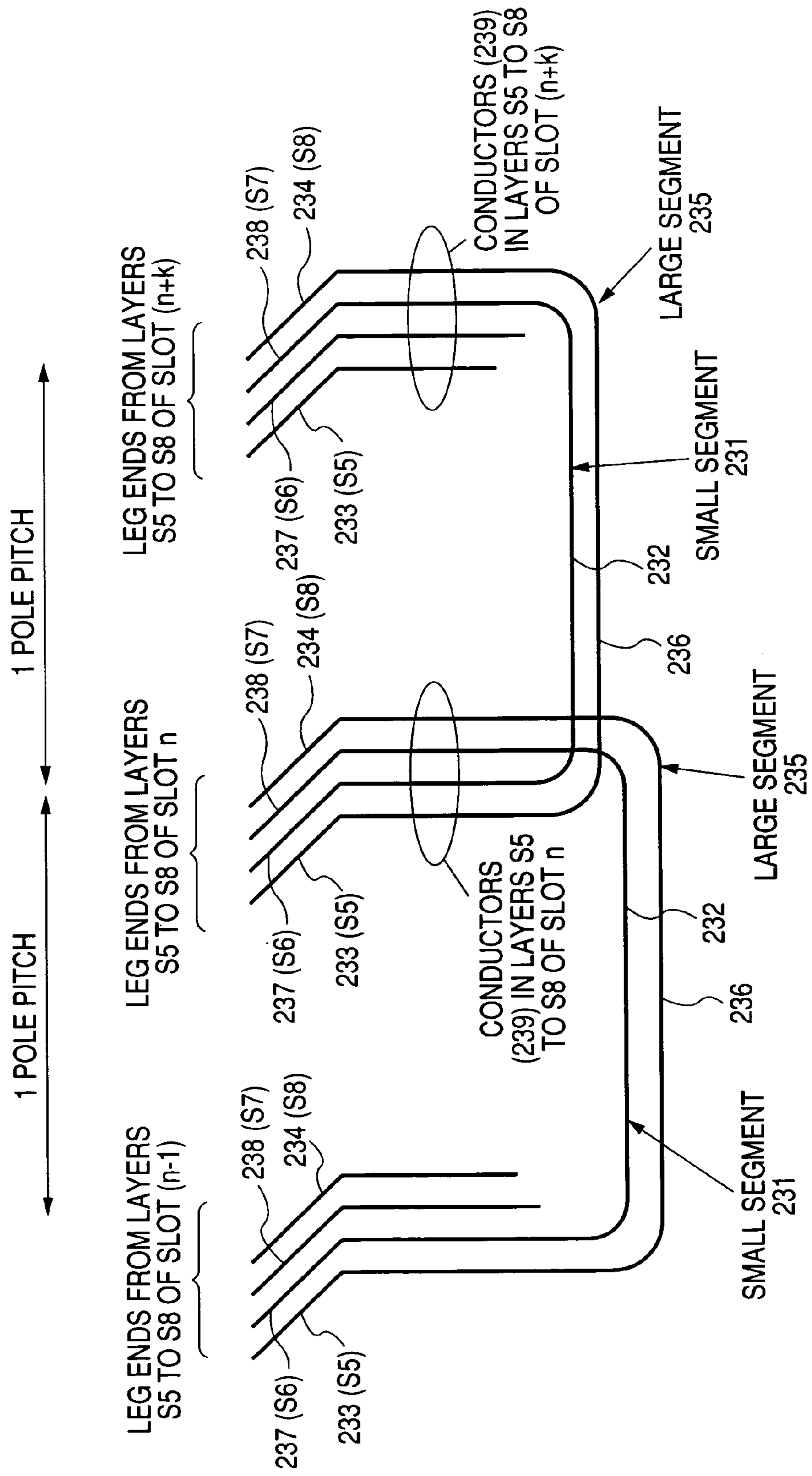
FIG. 16B is a corresponding diagram for the leg ends corresponding to the fifth to eighth conductor layers of a slot, with the fourth embodiment.
Figure 18:
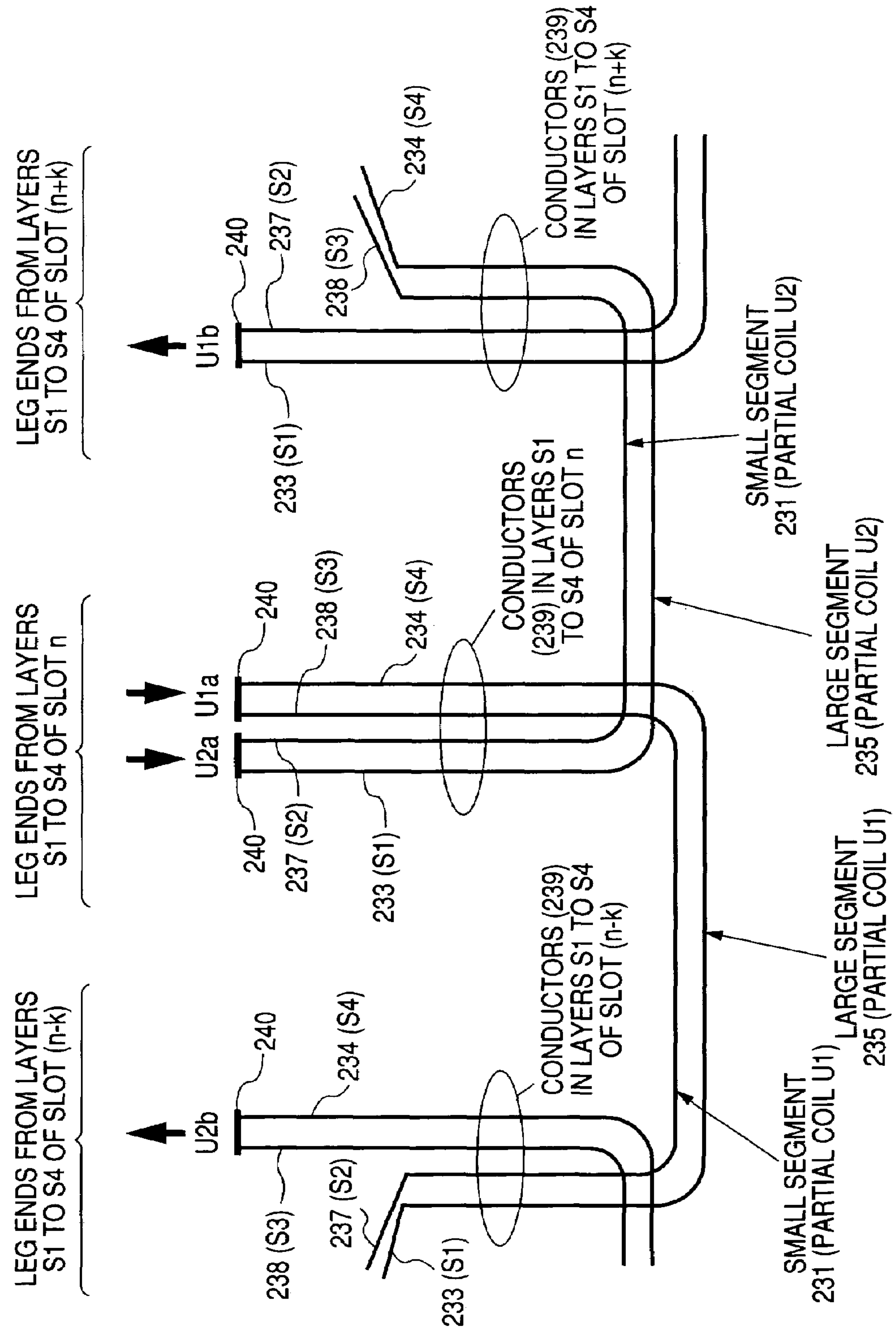
FIG. 18 is a conceptual winding diagram showing details of respective starting ends and terminating ends of the first and second partial coils of FIG. 17.

The above is illustrated in the conceptual winding diagrams of FIGS. 16A. 16B, which show the arrangement of segments and the direction of bending the leg ends for the case of the first segment group and the second segment group, respectively. FIG. 16A shows the segment connections between the conductors of layers S1 to S4 of a slot indicated as the $n^{th}$ slot, layers S1, S2 of the $(n-k)^{th}$ slot, and layers S3, S4 of the $(n+k)^{th}$ slot, where the pole pitch is k times the slot pitch. FIG. 16B similarly shows the segment connections between the conductors of layers S5 to S8 of the $n^{th}$ slot, layers S5, S6 of the $(n-k)^{th}$ slot, and layers S7, S8 of the $(n+k)^{th}$ slot.

It can thus be understood that with this embodiment, a 1-turn coil is formed by sequentially connecting together successive set of segment leg ends, with each set made up of leg ends from layers S1 to S4 (from segments that are in the first segment group) and adjacent leg ends from layers S5 to S8 (from segments that are in the second segment group). This is done for each of successive pairs of identical-phase slots that are separated by one pole pitch, as illustrated in FIGS. 14 and 16A, 16B, to thereby form a 1-turn wave-wound coil, which can be considered to consist of two parallel-connected wave-wound coils.

If each identical-phase slot set consists of m adjacent slots, i.e., there are m slots/pole, then there will be a total of m such single-turn coils per phase, each formed as described above (2m parallel-connected wave-wound partial coils per phase). If m is greater than 1, the m single-turn coils can be connected in series or in parallel to form one phase winding. Each of the three phase windings of the stator winding is similarly formed.

This embodiment has the advantage that each set of leg ends corresponding to four mutually adjacent layers within a slot (i.e., the set of layers S1 to S4, or the set of layer S5 to S8) are at the same potential. Hence, the requirements for electrical insulation within each slot are minimized.

Moreover each such set of four leg ends are bent in the same direction, before performing a welding operation to connect respective s of tip portions of adjacent leg ends, so that the manufacturing process is simplified. Thus this embodiment enables a stator winding in which each phase winding has only a small number of turns to be readily produced.

What is claimed is:

1. A 4-layer sequential segment connection stator winding for a stator of a rotary electric machine, said stator winding formed of a plurality of phase windings each comprising an even number of identical-phase partial coils each of which is a 1-turn coil formed of a plurality of U-shaped large segments and a plurality of U-shaped small segments, each said large segment having two legs that are disposed as first and fourth conductor layers respectively within a predetermined pair of slots of said stator that are circumferentially separated by one pole pitch of said rotary electric machine, with leg ends corresponding to said first and fourth conductor layers protruding from said slots, and each said small segment having two legs that are disposed as second and third conductor layers respectively within a predetermined pair of slots of said stator that are circumferentially separated by said one pole pitch, with leg ends corresponding to said second and third conductor layers protruding from said stator slots;

wherein:

each mutually adjacent pair of leg ends corresponding to said first and second conductor layers are connected to be at an identical potential and are bent in an identical direction for being joined to leg ends of other segments; and a pair of said partial coils comprise a first partial coil formed as a 1-turn wave-wound coil comprising, within each of respective predetermined ones of said stator slots, a mutually adjacent pair of said first, second, third and fourth conductor layers, and a second partial coil formed as a 1-turn coil comprising, within said each predetermined stator slot, a remaining mutually adjacent pair of said conductor layers.

2. A 4-layer sequential segment connection stator winding according to claim 1, wherein in each said first partial coil and said second partial coil, said leg ends corresponding to said first and second conductor layers within a first stator slot are connected to leg ends of a pair of segment legs corresponding to said third and fourth conductor layers within a second stator slot, said second stator slot being circumferentially displaced from said first stator slot by a distance substantially equal to said pole pitch.

3. A 4-layer sequential segment connection stator winding according to claim 1, wherein a starting end of said first partial coil extends from a first pair of respective leg ends of a first large segment and first small segment, and a starting end of said second partial coil extends from a pair of respective leg ends of a second large segment and second small segment, and wherein said first pair of leg ends correspond to a first pair of mutually adjacent conductor layers within one of said stator slots and second pair of segment legs correspond to a second pair of mutually adjacent conductor layers within said one of the stator slots.

4. A 4-layer sequential segment connection stator winding according to claim 1, wherein said phase winding comprises an even number of interconnected ones of said partial coils, said partial coils being accommodated in respectively different stator slots within each of respective sets of circumferentially adjacent identical-phase stator slots.

5. A 4-layer sequential segment connection stator winding according to claim 4, wherein:

each said set circumferentially adjacent identical-phase stator slots comprises m stator slots, where m is a natural number that is 1 or greater, each stator slot in said each set contains 4*n* of said conductor layers, where m is a natural number that is 2 or greater, a total of 2 nm of said partial coils are formed of said 4*n* conductor layers in said sets of m stator slots, and said phase winding is formed by interconnecting said 2 nm partial coils.

6. A 4-layer sequential segment connection stator winding according to claim 1, comprising at least one crossover segment, coupled between respective pairs of said segment legs for connecting at least two of said partial coils in series or in parallel.

7. A 4-layer sequential segment connection stator winding according to claim 1, comprising:

insulation paper disposed, at each of said stator slots, to separate respective head portions of a large segment and small segment having legs thereof disposed as said first and second conductor layers of said slot from respective head portions of a large segment and small segment having legs thereof disposed as said third and fourth conductor layers of said slot;

wherein said insulation paper is omitted from being disposed to mutually separate said head portions of said segments having legs thereof disposed as said first and second conductor layers of said slot, and said insulation paper is omitted from being disposed to mutually separate said head portions of said segments having legs thereof disposed as said third and fourth conductor layers of said slot.

8. A 4-layer sequential segment connection stator winding according to claim 1, comprising:

insulating paper disposed, at each of said stator slots, to separate a pair of leg ends corresponding to said first and second conductor layers of said stator slot from a pair of leg ends corresponding to said third and fourth conductor layers of said stator slot;

wherein said insulation paper is not disposed to mutually separate said leg ends corresponding to said first and second conductor layers of said stator slot and, said insulation paper is not disposed to mutually separate said leg ends corresponding to said third and fourth conductor layers of said stator slot.

9. A method of manufacturing a 4-layer sequential segment connection stator winding according to claim 1, comprising:

inserting respective legs of each of said large segments, with said in a straight condition, into a predetermined pair of said stator slots at respective positions of said first and fourth conductor layers within said stator slots;

inserting respective legs of each of said small segments, with said legs in a straight condition, into a predetermined pair of said stator slots at respective positions of said first and fourth conductor layers within said stator slots;

at each of said stator slots, bending each of respective leg ends corresponding to said first and second conductor layers in a first circumferential direction, to displace respective tip portions of said leg ends by an amount substantially equal to one half of said pole pitch;

bending each of respective leg ends corresponding to said third and fourth conductor layers in an opposite direction to said first circumferential direction, to displace respective tip portions of said leg ends by an amount substantially equal to said half pole pitch; and connecting each set of tip portions corresponding to said first and second conductor layers of a stator slot to an adjacent pair of tip portions corresponding to said third and fourth conductor layers of a stator slot.

* * * * *